United States Patent
Singh et al.

(10) Patent No.: US 8,654,771 B1
(45) Date of Patent: Feb. 18, 2014

(54) EFFICIENT TRANSFER OF PACKETS OVER MULTIPLE BACKHAUL LINKS

(75) Inventors: Jasinder Pal Singh, Olathe, KS (US); Sachin R. Vargantwar, Overland Park, KS (US); Deveshkumar Narendrapratap Rai, Overland Park, KS (US); Maulik K. Shah, Overland Park, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 593 days.

(21) Appl. No.: 12/699,617

(22) Filed: Feb. 3, 2010

(51) Int. Cl.
  *H04L 12/58* (2006.01)
(52) U.S. Cl.
  USPC ............ 370/394; 370/328; 370/329; 370/473
(58) Field of Classification Search
  None
  See application file for complete search history.

(56) References Cited

U.S. PATENT DOCUMENTS

| | | | |
|---|---|---|---|
| 6,510,135 B1 | 1/2003 | Almulhem et al. | |
| 6,594,268 B1 | 7/2003 | Aukia et al. | |
| 6,711,128 B1* | 3/2004 | Ramakrishnan | 370/230 |
| 7,457,315 B1* | 11/2008 | Smith | 370/473 |
| 7,773,506 B2* | 8/2010 | Agashe et al. | 370/230 |
| 2001/0038648 A1* | 11/2001 | Sutton et al. | 370/535 |
| 2003/0091029 A1 | 5/2003 | Jo et al. | |
| 2003/0119556 A1* | 6/2003 | Khan et al. | 455/560 |
| 2005/0078653 A1* | 4/2005 | Agashe et al. | 370/349 |
| 2006/0209742 A1* | 9/2006 | Haner et al. | 370/328 |
| 2007/0110005 A1* | 5/2007 | Jin et al. | 370/335 |
| 2009/0190569 A1* | 7/2009 | Hacena | 370/350 |
| 2010/0278140 A1* | 11/2010 | Smith et al. | 370/331 |

* cited by examiner

*Primary Examiner* — Donald Mills

(57) ABSTRACT

What is disclosed is a wireless network control system configured to communicate with a wireless access node over a plurality of backhaul links. The wireless network control system includes a backhaul interface configured to monitor individual transmission delays for the backhaul links. The wireless network control system also includes a processing system configured to determine a data packet for transfer to the wireless access node and separate the data packet into a sequence of packet fragments. The processing system is also configured to select an individual one of the backhaul links for each of the packet fragments based on relative positions of the packet fragments in the sequence and based on the individual transmission delays of the backhaul links.

18 Claims, 6 Drawing Sheets

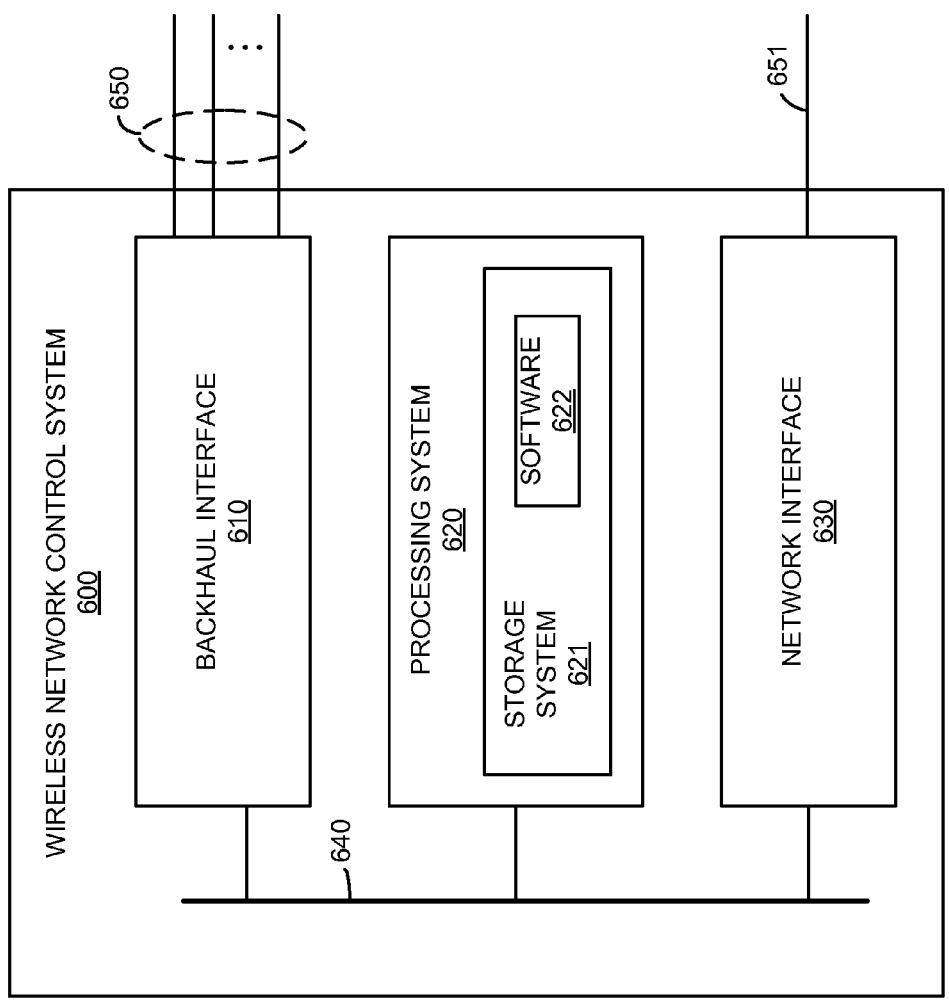

EFFICIENT TRANSFER OF PACKETS OVER MULTIPLE BACKHAUL LINKS

TECHNICAL FIELD

Aspects of the disclosure are related to the field of communications, and in particular, transferring packets over multiple backhaul links in wireless communication networks.

TECHNICAL BACKGROUND

Wireless communication systems typically include wireless access nodes, such as base stations, which provide wireless access to communication services for user devices over wireless links. A typical wireless communication system includes many wireless access nodes to provide wireless access across a geographic region, with individual wireless coverage areas associated with each wireless access node. The wireless access nodes exchange user communications and overhead communications with a core network of the wireless communication system over backhaul communication links to control nodes. The control nodes typically coordinate handoffs of user devices moving between coverage areas of different wireless access nodes, control the operation of the wireless access nodes, and route communications, among other functions. In some examples, the communications are packet-based, and the control nodes separate the packets into fragments for transfer over the backhaul communication links.

However, the backhaul communication links can often become heavily loaded or experience delays when many users receive wireless access from a single wireless access node, or when a few users consume a large amount of bandwidth. Additionally, faults in the backhaul communication links can occur, such as cable faults or equipment failure. Unfortunately, when the backhaul communication link of a wireless access node experiences a heavy load, delays, or faults, wireless access to communication services through that wireless access node may be reduced and user devices may experience poor performance.

OVERVIEW

What is disclosed is a wireless network control system configured to communicate with a wireless access node over a plurality of backhaul links. The wireless network control system includes a backhaul interface configured to monitor individual transmission delays for the backhaul links. The wireless network control system also includes a processing system configured to determine a data packet for transfer to the wireless access node and separate the data packet into a sequence of packet fragments. The processing system is also configured to select an individual one of the backhaul links for each of the packet fragments based on relative positions of the packet fragments in the sequence and based on the individual transmission delays of the backhaul links.

What is also disclosed is a method of operating a wireless network control system that communicates with a wireless access node over a plurality of backhaul links. The method includes, in the wireless network control system, monitoring individual transmission delays for the backhaul links. The method also includes, in the wireless network control system, determining a data packet for transfer to the wireless access node and separating the data packet into a sequence of packet fragments. The method also includes, in the wireless network control system, selecting an individual one of the backhaul links for each of the packet fragments based on relative positions of the packet fragments in the sequence and based on the individual transmission delays of the backhaul links.

What is also disclosed is a method of operating a communication system, where a wireless network control system communicates with a wireless access node over a plurality of backhaul links. The method includes, in the wireless network control system, monitoring individual transmission delays for the backhaul links, receiving a data packet for transfer to the wireless access node, and separating the data packet into a sequence of packet fragments. The method also includes, in the wireless network control system, selecting an individual one of the backhaul links for each of the packet fragments based on relative positions of the packet fragments in the sequence and based on the individual transmission delays of the backhaul links, and transferring individual ones of the packet fragments over the associated selected ones of the backhaul links for delivery to the wireless access node. The method also includes, in the wireless access node, receiving the packet fragments, compositing the individual ones of the packet fragments in order of receipt by the wireless access node, and transferring the composited packet fragments to a user device over a wireless link.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views. While several embodiments are described in connection with these drawings, the disclosure is not limited to the embodiments disclosed herein. On the contrary, the intent is to cover all alternatives, modifications, and equivalents.

FIG. 6 is a block diagram illustrating a wireless network control system.

DETAILED DESCRIPTION

Figure 1:
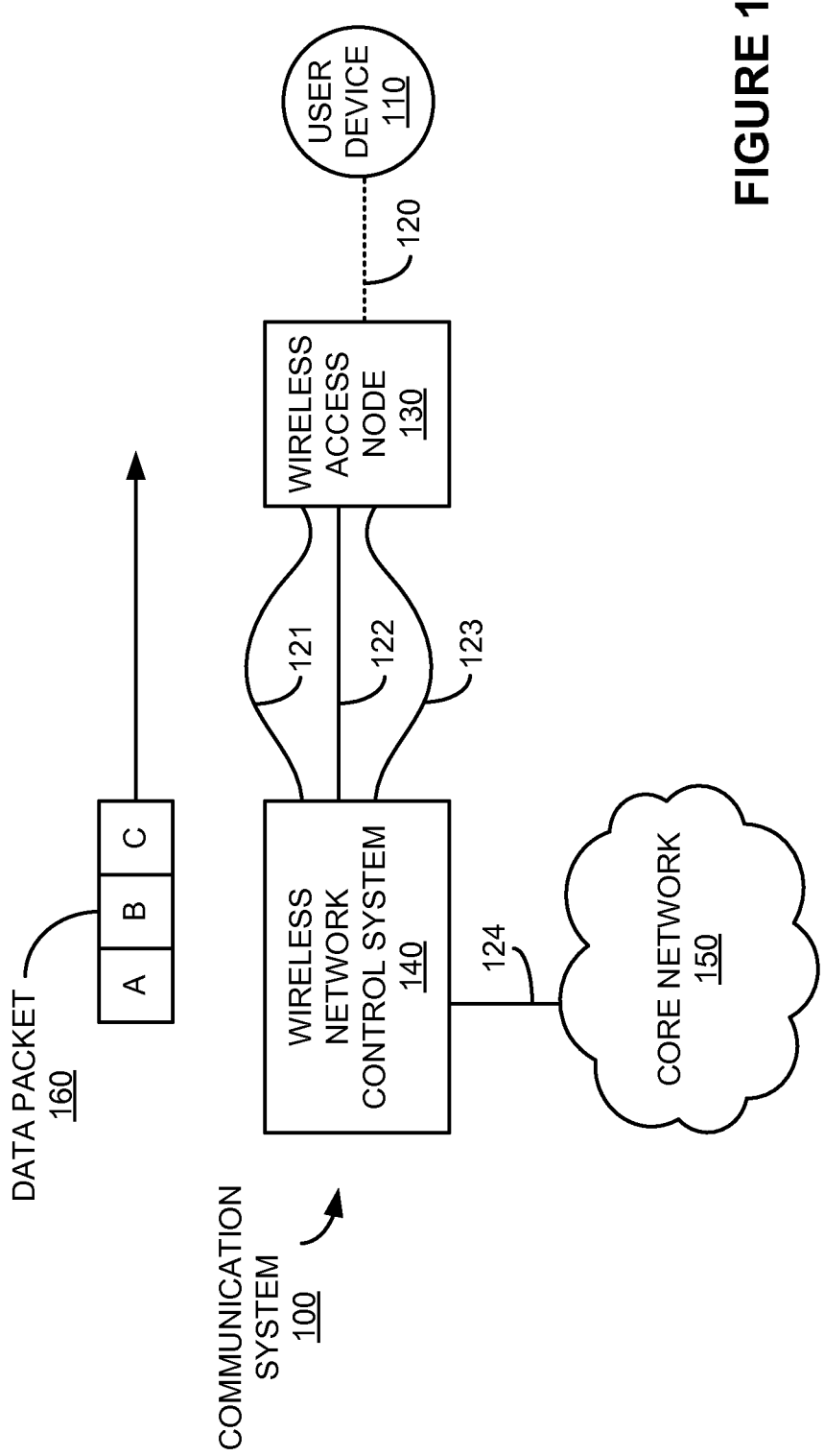
FIG. 1 is a system diagram illustrating a communication system.

FIG. 1 is a system diagram illustrating communication system 100. Communication system 100 includes user device 110, wireless access node 130, wireless network control system 140, and core network 150. User device 110 and wireless access node 130 communicate over wireless link 120. Wireless access node 130 and wireless network control system 140 communicate over backhaul links 121-123. Wireless network control system 140 and core network 150 communicate over link 124.

In FIG. 1, wireless access node 130 provides wireless access to communication services for user device 110 over wireless link 120. User communications and overhead communications are typically exchanged between wireless network control system 140 and wireless access node 130 over backhaul links 121-123. These user and overhead communications can include communications related to the wireless access of user device 110 and other user devices, among other communications.

Figure 2:
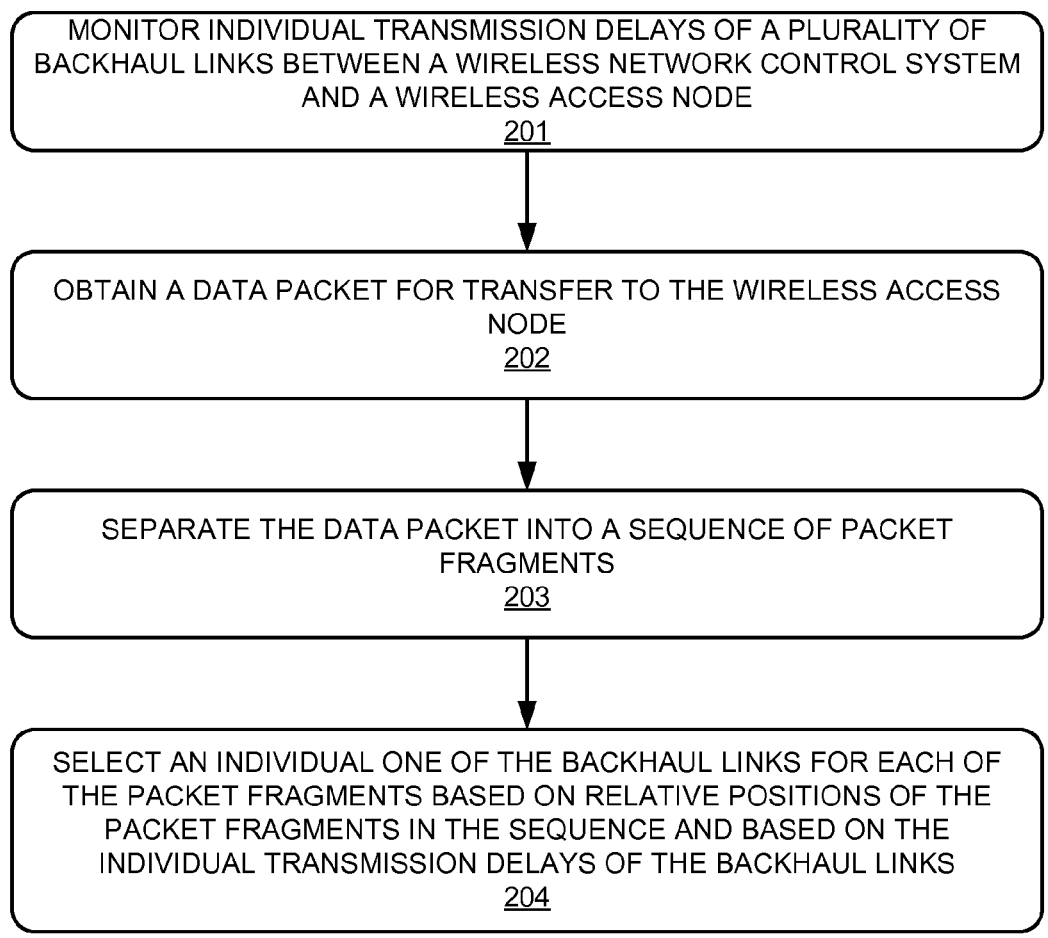
FIG. 2 is a flow diagram illustrating a method of operation of a communication system.

FIG. 2 is a flow diagram illustrating a method of operation of communication system 100. The operations of FIG. 2 are referenced herein parenthetically. In FIG. 2, wireless network control system 140 monitors (201) individual transmission delays of backhaul links 121-123 between wireless network control system 140 and wireless access node 130. The transmission delays could indicate a transit time for data over each of backhaul links 121-123, or could indicate a ping time, a roundtrip delay, or other delays. Wireless network control system 140 obtains (202) a data packet for transfer to wireless access node 130. In this example, data packet 160 is shown for transfer to wireless access node 130, and could comprise an Ethernet packet, Internet Protocol (IP) packet, asynchronous transfer mode (ATM) cell, datagram, or other data packet. In some examples, data packet 160 is received from core network 150 over link 124, while in other examples, wireless network control system 140 creates or modifies data packet 160.

Wireless network control system 140 separates (203) data packet 160 into a sequence of packet fragments. In the example shown in FIG. 1, data packet 160 is separated into a sequence of three packet fragments, ABC, although other configurations could be used. The separation of data packet 160 into packet fragments could be based upon a size of the resultant packet fragments, upon a data type, a separation of the header and payload of data packet 160, the bandwidth or data carrying characteristics of backhaul links 121-123, or upon other considerations. Wireless network control system 140 then selects (204) an individual one of the backhaul links for each of the packet fragments based on relative positions of the packet fragments in the sequence and based on the individual transmission delays of backhaul links 121-123. For example, a backhaul link with a smaller transmission delay could be selected to carry a first packet fragment of the data packet, while a backhaul link with a larger transmission delay could be selected to carry a second packet fragment of the data packet, where the first packet fragment is earlier in the sequence of packet fragments than the second.

In further examples, wireless network control system 140 transfers the packet fragments over the associated selected ones of the backhaul links for receipt by wireless access node 130. Wireless access node 130 could then receive the packet fragments over the individual backhaul links 121-123, and composite the packet fragments into a data packet. In some examples, the composited data packet is a user data packet for delivery to user device 110 over wireless link 120.

Figure 3:
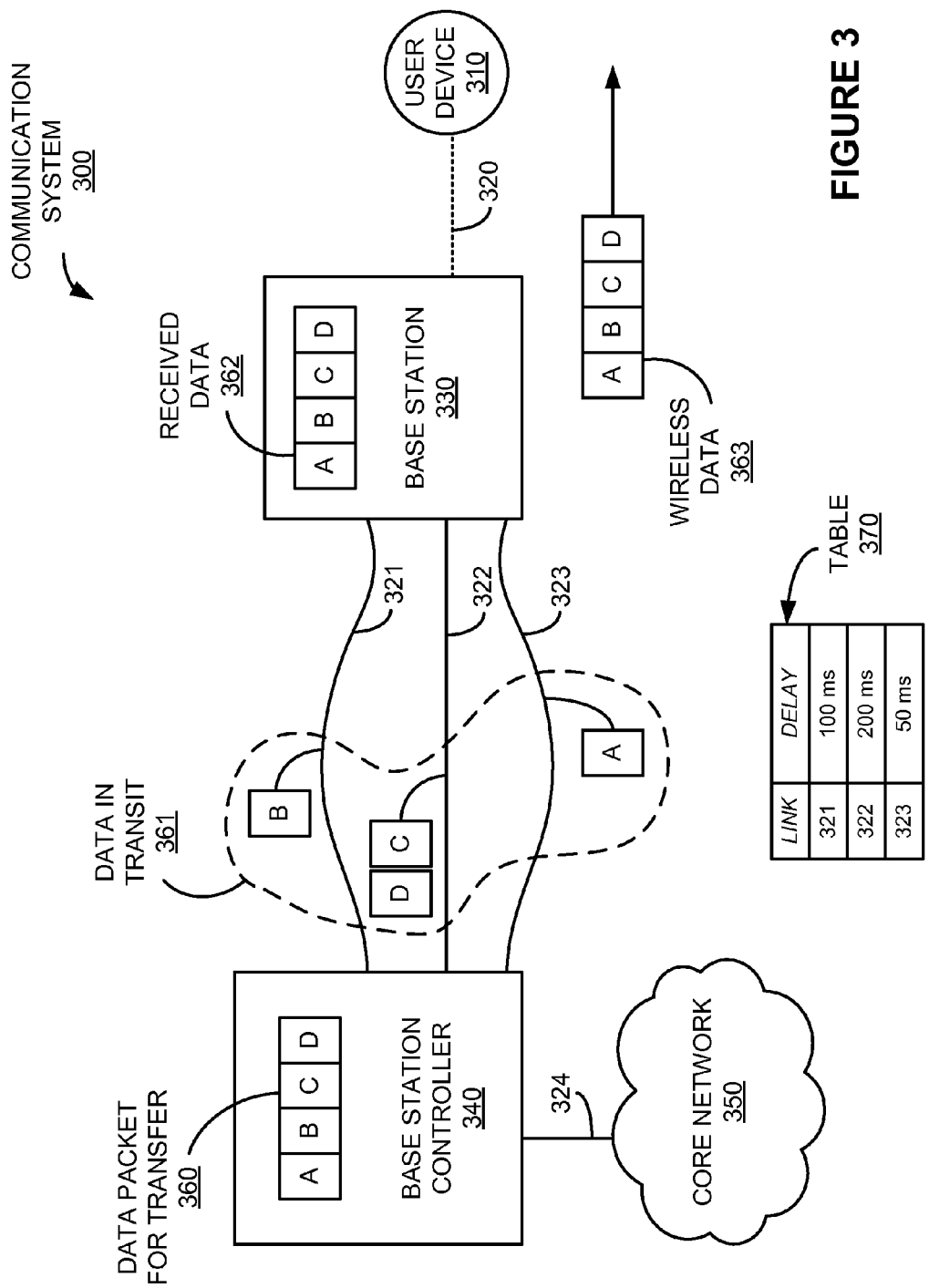
FIG. 3 is a system diagram illustrating a communication system.

FIG. 3 is a system diagram illustrating communication system 300. Communication system 300 includes user device 310, base station 330, base station controller 340, and core network 350. FIG. 3 also includes table 370 which indicates example transmission delays associated with each of backhaul links 321-323. User device 310 and base station 330 communicate over wireless link 320. In this example, wireless link 320 uses the Evolution-Data Optimized (EV-DO) wireless protocol. Also in this example, user device 310 is a mobile smartphone. Base station 330 and base station controller 340 communicate over backhaul links 321-323. In this example, backhaul link 321 is a T1 link, backhaul link 322 is an Ethernet link, and backhaul link 323 is an optical link, where backhaul links 321-323 can carry Internet protocol (IP) traffic, such as IP data packets. Base station controller 340 and core network 350 communicate over link 324. In this example, link 324 is an optical networking link capable of carrying Internet protocol (IP) packets.

Base station 330 could include RF communication and control circuitry and antennas, as well as wireless communications equipment, among other equipment, capable of communicating with and providing wireless access to communication services for user devices over a limited geographic area. Base station 330 typically provides wireless access for communication services to user devices, such as user device 310, over wireless link 320 after a registration process. User communications and overhead communications for the user devices are typically exchanged between base station controller 340 and base station 330 over backhaul links 321-323. These user and overhead communications can include communications related to the wireless access of user devices and the operation of base station 330, among other communications.

Base station controller 340 includes equipment such as communication interfaces and processing systems for communicating with and controlling base stations, such as base station 330. Base station controller 340 could also include communication equipment capable of routing communications exchanged between base station 330 and core network 350. In this example, base station 330 is operated by the same wireless service provider as base station controller 340. Core network 350 is a core network of a wireless access system in this example. Core network 350 could include further base stations, routers, gateways, controller systems, processing systems, access systems, or other communication equipment, and could be coupled to the Internet.

Figure 4:
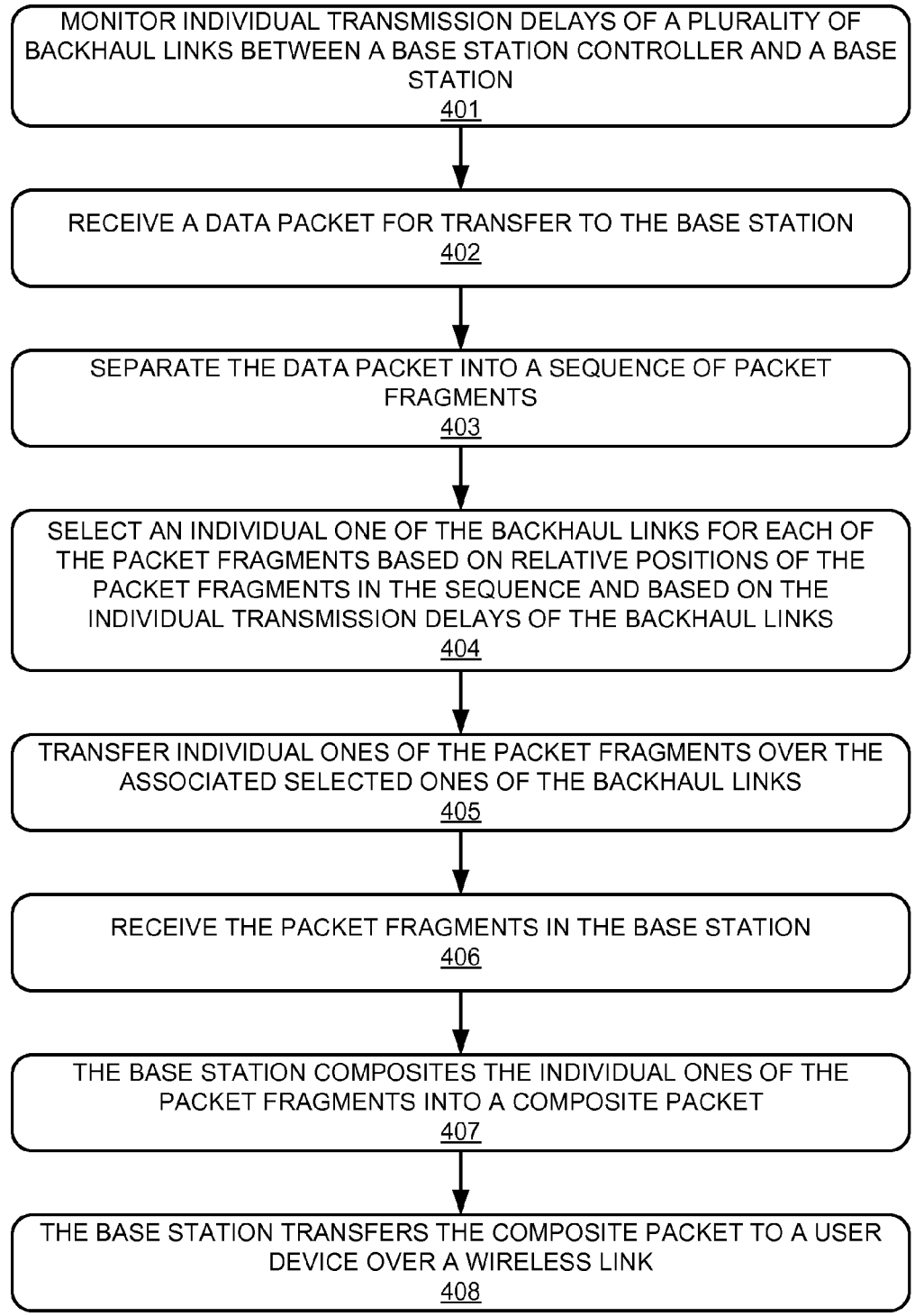
FIG. 4 is a flow diagram illustrating a method of operation of a communication system.

FIG. 4 is a flow diagram illustrating a method of operation of communication system 300. The operations of FIG. 4 are referenced herein parenthetically. In FIG. 4, base station controller 340 monitors (401) individual transmission delays of backhaul links 321-323 between base station controller 340 and base station 330. In some examples, to monitor transmission delays, base station controller 340 periodically exchanges test data over each of backhaul links 321-323 and measures a transit time of the test data over each backhaul link. The test data could include sample data packets exchanged with base station 330, where a timer is employed to measure a transit time. The test data could also be represented by user data which is monitored during normal operation for a transit time over a backhaul link. Other methods of measuring the transmission delay of each of backhaul links 321-323 could be employed, such as a ping, traceroute, physical distance or location, backhaul link length, interface delay, photon propagation delay, among other methods. The transmission delay could be measured in seconds, milliseconds, processor cycles, or in other units on an absolute or relative scale. In further examples, to monitor transmission delays, a present bandwidth is determined for each of backhaul links 321-323. The present bandwidth could depend upon the type of link used for each of backhaul links 321-323, for example, an optical link may have a greater bandwidth than a metal wireline link. The present bandwidth may also relate to a current level of traffic carried over each backhaul link, to a communication protocol employed over each backhaul link, or to a fault or error condition present on a backhaul link.

Base station controller 340 receives (402) data packet 360 for transfer to base station 330. In this example, data packet 360 is user data for transfer to user device 310, received by base station controller 340 over link 324 from core network 350. In other examples, a data packet could be created by base station controller 340 for use in overhead communications or control of user device 310 or base station 330. In yet further examples, a data packet received from core network 350 could be modified by base station controller 340. The data packet could be a transmission control protocol/IP (TCP/IP) packet, Ethernet packet, IP packet, datagram, cell, or other data packet.

Base station controller 340 then separates (403) data packet 360 into a sequence of packet fragments. In the example shown in FIG. 3, data packet 360 is separated into a sequence of four packet fragments, ABCD. The number of packet fragments that data packet 360 is separated into by base station controller 340 could depend upon different factors. These factors could include a number of backhaul links available between base station controller 340 and base station 330, a number of backhaul links with available bandwidth, an available bandwidth of backhaul links 321-323, a predetermined packet fragment size, an equal size, or based on properties of data packet 360, such as header and payload sizes, an application type for data within data packet 360, among other factors. In further examples, data packet 360, or another separately received packet, includes information which indicates a preferred separation size or separation boundaries for packet fragments of data packet 360. In this example, although there are three backhaul links 321-323, data packet 360 is separated into four packet fragments. Data packet 360 could be separated into individual packets to form the packet fragments, where the individual packets formed from separating data packet 360 would include a portion of the original data packet 360. Each individual packet could include a header and payload. The header could include the header of the original data packet 360, or could be a new or modified header. The payload could include a portion of the payload of data packet 360, or the original or modified header of data packet 360 along with a portion of the payload of data packet 360. Unique sequence numbering or identifiers could be employed to identify, track, or sequentially identify the packet fragments of data packet 360. In further examples, the payload of data packet 360 is separated into packet fragments and the header of data packet 360 is included in a new packet payload. In yet further examples, redundant information could be included within more than one packet fragment.

Base station controller 340 selects (404) an individual one of backhaul links 321-323 for each of the packet fragments ABCD. The individual one of backhaul links 321-323 for each of the packet fragments ABCD are selected based on the transmission delay of each of backhaul links 321-323 and the relative position of the packet fragments in the sequence of packet fragments ABCD formed from data packet 360. In this example, increasingly latter packet fragments of the sequence of packet fragments are selected for transfer over backhaul links with increasing transmission delays. As shown in table 370 of FIG. 3, link 323 has the shortest transmission delay of 50 milliseconds (ms), link 321 has a medium transmission delay of 100 ms, and link 322 has the longest transmission delay of 200 ms. Therefore, in this example, backhaul link 323 is selected for packet fragment A, backhaul link 321 is selected for packet fragment B, and backhaul link 322 is selected for packet fragments C and D. It should be understood that a different order could be selected, such as where increasingly latter packet fragments of the sequence of packet fragments are selected for transfer over backhaul links with decreasing transmission delays. Base station controller 340 transfers (405) the individual packet fragments A, B, C, and D over the associated selected backhaul link. Therefore, as shown in FIG. 3 as "data in transit" 361, packet fragment A is transferred over backhaul link 323, packet fragment B is transferred over backhaul link 321, and packet fragments C and D are transferred over backhaul link 322. In this manner, the packet fragments should transit the respective backhaul link and arrive at base station 330 in a sequence as determined by the transmission delays. In this example, packet fragments A, B, and C are be placed on the associated selected backhaul links simultaneously, while packet fragment D is placed on the associated selected backhaul link 322 after fragment C.

Base station 330 then receives (406) the individual packet fragments. Since each packet fragment was transferred over a backhaul link with an increasing transmission delay in this example, base station 330 should receive the packet fragments in a desired order, namely ABCD as shown in FIG. 3 as "received data" 362. Advantageously, even though packet fragments A, B, and C were placed on the associated selected backhaul links simultaneously, the packet fragments arrive at base station 330 in the sequence ABC. Base station 330 composites (407) the individual packet fragments into a composite packet. In this example, base station 330 composites the individual packet fragments in the order of receipt over backhaul links 321-323. In other examples, base station 330 could composite the packet fragments based upon a reverse order of receipt, a sequence identifier embedded in the packet fragments, a header of the packet fragments, or upon a separately transferred indicator of sequence or header information, among other compositing orders. In further examples, base station 330 composites the individual packet fragments into a composite packet, where the composite packet comprises a header comprising an indicator of user device 310 and a payload comprising the packet fragments composited in the order of receipt by base station 330. Base station 330 transfers (408) the composite packet to user device 310 over wireless link 320. In some examples, base station 330 does not create a composite packet, and serially transfers the individual packet fragments over wireless link 320 in the order as received over backhaul links 321-323. Thus, user device 310 would receive the packet fragments over wireless link 320 in the order that base station 330 had previously received the packet fragments.

In some examples, if the packet fragments are not received in the correct sequence, then base station 330 could reject the packet fragments. In other examples, user device 310 could reject the packet fragments or composite packet if the packet fragments are not received in the correct sequence or the composited packet is not formed in the correct sequence. The packet fragments may have error checking information, such as a cyclic redundancy check (CRC) or a checksum, associated therewith, which may allow user device 310 or base station 330 to determine erroneous data or out of order data when processed with packet fragments received out of a correct order. User device 310 or base station 330 could report a rejection of the composite packet or packet fragments using a rejection indicator, such as an acknowledge (ACK) or negative-acknowledge (NAK) indicator to base station controller 330. Base station controller 330 could retransfer the packet fragments, re-separate data packet 360 into different packet fragments, or recalculate transmission delays of backhaul links 321-323, among other actions, in response to the rejection indicator. In some protocols employed over wireless links, such as Radio Link Protocol (RLP) employed over Code Division Multiple Access (CDMA) wireless links, large packets can be separated into smaller packet fragments, smaller packets, cells, or datagrams, before transfer over the wireless link. This separation could occur, as shown in FIG. 3 and discussed in FIG. 4, in base station controller 340 or may occur in base station 330 prior to transfer over wireless link 320.

In further examples, user device 310 could determine uplink data for transfer over wireless link 320, such as user data, application data, overhead data, or other data. This data could be transferred in packets, cells, datagrams, or packet fragments in a reverse manner as described in FIG. 4. Base station 330 could then select an individual backhaul link for each of the uplink data packet fragments based on transmission delay of the individual backhaul links 321-323 and the sequential position of the uplink data packet fragments or order of receipt in base station 330 over wireless link 320. Base station 330 could then transfer the individual uplink data packet fragments over the associated selected backhaul links for receipt in base station controller 340. Base station controller 340 could then composite the uplink data packet fragments as received into a composite data packet for transfer over link 324 to core network 350.

Figure 5:
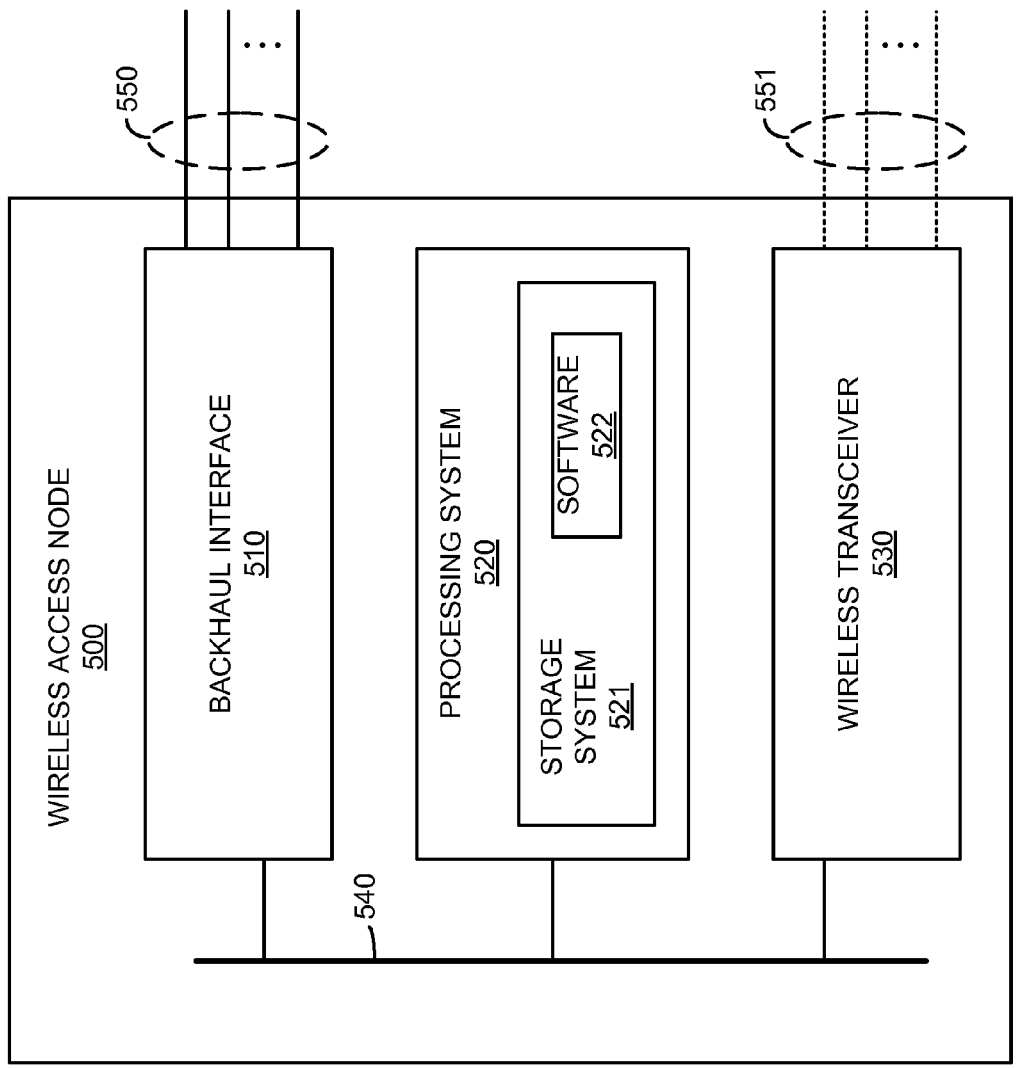
FIG. 5 is a block diagram illustrating a wireless access node.

FIG. 5 is a block diagram illustrating wireless access node 500, as an example of wireless access node 130 found in FIG. 1 or base station 330 found in FIG. 3, although wireless access node 130 or base station 330 could use other configurations. Wireless access node 500 includes backhaul interface 510, processing system 520, and wireless transceiver 530. Backhaul interface 510, processing system 520, and wireless transceiver 530 communicate over bus 540. Wireless access node 500 may be distributed among multiple devices that together form elements 510, 520-522, 530, 540, and 550-551.

Backhaul interface 510 comprises network router and gateway equipment for communicating with a network of a wireless communication provider, such as with a wireless network control system, base station controller, or other wireless access system. Backhaul interface 510 exchanges user communications and overhead communications with a wireless network control system or other wireless access system of a wireless communication system, omitted for clarity, over links 550. In some examples, backhaul interface 510 monitors individual transmission delays of links 550. Links 550 could each use various protocols or communication formats as described herein for links 121-123 or 321-323, including combinations, variations, or improvements thereof.

Processing system 520 includes storage system 521. Processing system 520 retrieves and executes software 522 from storage system 521. In some examples, processing system 520 is located within the same equipment in which backhaul interface 510 or wireless transceiver 530 are located. In further examples, processing system 520 comprises specialized circuitry, and software 522 or storage system 521 could be included in the specialized circuitry to operate processing system 520 as described herein. Storage system 521 could include a computer-readable medium such as a disk, tape, integrated circuit, server, or some other memory device, and also may be distributed among multiple memory devices. Software 522 may include an operating system, logs, utilities, drivers, networking software, and other software typically loaded onto a computer system. Software 522 could contain an application program, firmware, or some other form of computer-readable processing instructions. When executed by processing system 520, software 522 directs processing system 520 to operate as described herein, such as provide wireless access to user devices, route communications between user devices and a wireless network control system, assemble packet fragments into composite data packets, and separate packets into a sequence of packet fragments.

Wireless transceiver 530 comprises communication interfaces for communicating with user devices. Wireless transceiver 530 could include transceiver equipment and antenna elements for wirelessly exchanging user communications and overhead communications with user devices in a wireless communication system, omitted for clarity, over links 551. In some examples, two or more of links 551 are used to communicate with a single user device. Wireless transceiver 530 also receives command and control information and instructions from processing system 520 or backhaul interface 510 for controlling the operations of user devices over links 551, as well as for coordinating handoffs of user devices between other wireless access nodes or base stations. Links 551 could each use various protocols or communication formats as described herein for wireless links 120 or 320, including combinations, variations, or improvements thereof.

Bus 540 comprises a physical, logical, or virtual communication link, capable of communicating data, control signals, and communications, along with other information. In some examples, bus 540 is encapsulated within the elements of backhaul interface 510, processing system 520, or wireless transceiver 530, and may be a software or logical link. In other examples, bus 540 uses various communication media, such as air, space, metal, optical fiber, or some other signal propagation path, including combinations thereof. Bus 540 could be a direct link or might include various equipment, intermediate components, systems, and networks.

FIG. 6 is a block diagram illustrating wireless network control system 600, as an example of wireless network control system 140 found in FIG. 1 or base station controller 340 found in FIG. 3, although wireless network control system 130 or base station controller 330 could use other configurations. Wireless network control system 600 includes backhaul interface 610, processing system 620, and network interface 630. Backhaul interface 610, processing system 620, and network interface 630 communicate over bus 640. Wireless network control system 600 may be distributed among multiple devices that together form elements 610, 620-622, 630, 640, and 650-651.

Backhaul interface 610 comprises communication interfaces for communicating with and controlling the operations of wireless access nodes over links 650, as well as monitoring individual transmission delays of links 650. Backhaul interface 610 also receives command and control information and instructions from processing system 620 or network interface 630 for controlling the operations of wireless access nodes over links 650, as well as for coordinating handoffs of user devices between wireless access nodes. Links 650 could each use various protocols or communication formats as described herein for links 121-123 or 321-323, including combinations, variations, or improvements thereof.

Processing system 620 includes storage system 621. Processing system 620 retrieves and executes software 622 from storage system 621. In some examples, processing system 620 is located within the same equipment in which backhaul interface 610 or network interface 630 are located. In further examples, processing system 620 comprises specialized circuitry, and software 622 or storage system 621 could be included in the specialized circuitry to operate processing system 620 as described herein. Storage system 621 could include a computer-readable medium such as a disk, tape, integrated circuit, server, or some other memory device, and also may be distributed among multiple memory devices. Software 622 may include an operating system, logs, utilities, drivers, networking software, and other software typically loaded onto a computer system. Software 622 could contain an application program, firmware, or some other form of computer-readable processing instructions. When executed by processing system 620, software 622 directs processing system 620 to operate as described herein, such as route communications between a core network and wireless access nodes, separate packets into a sequence of packet fragments, assemble packet fragments into composite data packets, or monitor transmission delays of links 650.

Network interface 630 comprises network router and gateway equipment for communicating with a core network of a wireless communication provider, such as with core network 150 or core network 350. Network interface 630 exchanges user communications and overhead communications with a core network of a wireless communication system over link 651. Link 651 could use various protocols or communication formats as described herein for links 124 or 324, including combinations, variations, or improvements thereof.

Bus 640 comprises a physical, logical, or virtual communication link, capable of communicating data, control signals, and communications, along with other information. In some examples, bus 640 is encapsulated within the elements of backhaul interface 610, processing system 620, or network interface 630, and may be a software or logical link. In other examples, bus 640 uses various communication media, such as air, space, metal, optical fiber, or some other signal propagation path, including combinations thereof. Bus 640 could be a direct link or might include various equipment, intermediate components, systems, and networks.

Referring back to FIG. 1, user device 110 comprises radio frequency (RF) communication circuitry and antenna elements. The RF communication circuitry typically includes amplifiers, filters, modulators, and signal processing circuitry. In many examples, user device 110 includes circuitry and equipment to exchange communications of multiple wireless communication services over multiple wireless links, or with multiple base stations. User device 110 may also include user interface systems, memory devices, computer-readable storage mediums, software, processing circuitry, or some other communication components. User device 110 may be a wireless communication device, subscriber equipment, customer equipment, access terminal, telephone, mobile wireless telephone, computer, e-book, mobile Internet appliance, wireless network interface card, media player, game console, or some other wireless communication apparatus, including combinations thereof. Although one user device is shown in FIG. 1, it should be understood that a different number of user devices could be included.

Wireless access node 130 comprises RF communication and control circuitry, antenna elements, and communication routing equipment and systems. The RF communication circuitry typically includes amplifiers, filters, RF modulators, and signal processing circuitry. In many examples, wireless access node 130 includes equipment to provide wireless access to communication services for user device 110, route communications between wireless network control system 140 and user device 110, monitor transmission delays of backhaul links, and composite packet fragments into composite packets. Wireless access node 130 may also comprise wireless data modems, routers, servers, memory devices, software, processing circuitry, cabling, network communication interfaces, physical structural supports, or other communication apparatuses. Wireless access node 130 could comprise a base station or base transceiver station.

Wireless network control system 140 comprises processing equipment for monitoring transmission delays of backhaul links, routing communications between core network 150 and wireless access node 130, separating data packets into packet fragments, compositing packet fragments into composite packets, and for controlling the operations of wireless access node 130. Wireless network control system 140 may also comprise routers, servers, memory devices, software, processing circuitry, cabling, network communication interfaces, base station controllers (BSC), mobile switching centers (MSC), radio node controllers (RNC), mobile switching centers (MSC), call processing systems, authentication, authorization and accounting (AAA) equipment, access service network gateways (ASN-GW), Internet access nodes, telephony service nodes, or other communication equipment and apparatuses. In some examples, features of wireless network control system 140 and wireless access node 130 are included in the same equipment or systems. Wireless network control system 140 may also comprise optical networks, asynchronous transfer mode (ATM) networks, packet networks, metropolitan-area networks (MAN), or other network topologies, equipment, or systems, including combinations thereof.

Wireless link 120 uses the air or space as the transport media. Wireless link 120 may use various protocols, such as Code Division Multiple Access (CDMA), Evolution-Data Optimized (EV-DO), Worldwide Interoperability for Microwave Access (WIMAX), Global System for Mobile Communication (GSM), Universal Mobile Telecommunications System (UMTS), Long Term Evolution (LTE), Wireless Fidelity (WIFI), High Speed Packet Access (HSPA), Radio Link Protocol (RLP), or some other wireless communication format, including combinations, improvements, or variations thereof. Although one wireless link 120 is shown in FIG. 1, it should be understood that wireless link 120 is merely illustrative to show a communication session or wireless access pathway for user device 110. In other examples, multiple wireless links could be shown, with portions of the wireless links shared between other user devices and used for different communication sessions and associated overhead communications.

Communication links 121-124 each use metal, glass, optical, air, space, or some other material as the transport media. Communication links 121-124 could each use various communication protocols, such as Time Division Multiplex (TDM), asynchronous transfer mode (ATM), Internet Protocol (IP), Ethernet, synchronous optical networking (SONET), circuit-switched, communication signaling, wireless protocols as described for wireless link 120, or some other communication format, including combinations, improvements, or variations thereof.

Links 120-124 may each include many different signals sharing the same link—as represented by the associated lines in FIG. 1—comprising access channels, forward links, reverse links, user communications, communication sessions, overhead communications, frequencies, channels, carriers, timeslots, transportation ports, logical transportation links, network sockets, packets, or communication directions. Communication links 121-124 could each be direct links or may include intermediate networks, systems, or devices. In many examples, the portion of wireless link 120 as transmitted by user device 110 is referred to an uplink or reverse link of the wireless link, while the portion as transmitted by wireless access node 130 is referred to as a downlink or forward link of the wireless link.

FIGS. 1-6 and the previous descriptions depict specific embodiments to teach those skilled in the art how to make and use the best mode. For the purpose of teaching inventive principles, some conventional aspects have been simplified or omitted. Those skilled in the art will appreciate variations from these embodiments that fall within the scope of the invention. Those skilled in the art will also appreciate that the features described above can be combined in various ways to form multiple embodiments. As a result, the invention is not limited to the specific embodiments described above, but only by the claims and their equivalents.

What is claimed is:

1. A method of operating a wireless network control system that communicates with a wireless access node over a plurality of backhaul links, the method comprising:

in the wireless network control system, monitoring individual transmission delays for the backhaul links;

in the wireless network control system, obtaining a data packet for transfer to the wireless access node;

in the wireless network control system, identifying a consecutive sequence of packet fragments that comprise the data packet and separating the data packet into the consecutive sequence of packet fragments;

in the wireless network control system, selecting an individual one of the backhaul links for each of the packet fragments based on correlating relative positions of the packet fragments in the consecutive sequence to the individual transmission delays of the backhaul links; and transferring simultaneously each of the packet fragments over the selected individual one of the backhaul links for delivery to the wireless access node so the packet fragments are received by the wireless access node in the consecutive sequence.

2. The method of claim 1, wherein selecting the individual one of the backhaul links for each of the packet fragments comprises selecting increasingly latter packet fragments of the sequence of packet fragments for transfer over backhaul links with increasing transmission delays.

3. The method of claim 1, wherein selecting the individual one of the backhaul links for each of the packet fragments comprises selecting increasingly latter packet fragments of the sequence of packet fragments for transfer over backhaul links with decreasing transmission delays.

4. The method of claim 1, wherein monitoring the individual transmission delays for the backhaul links comprises periodically exchanging test data over each of the backhaul links and measuring a transmit time of the test data over each of the backhaul links.

5. The method of claim 1, wherein obtaining the data packet for transfer to the wireless access node comprises receiving the data packet in the in the wireless network control system and determining that the data packet is for transfer to the wireless access node.

6. The method of claim 1, wherein the backhaul links each comprise Internet Protocol (IP) links.

7. The method of claim 1, wherein the backhaul links each comprise T1 links.

8. A wireless network control system configured to communicate with a wireless access node over a plurality of backhaul links, comprising:

a backhaul interface configured to monitor individual transmission delays for the backhaul links;

a processing system configured to obtain a data packet for transfer to the wireless access node, identify a consecutive sequence of packet fragments that comprise the data packet, and separate the data packet into the consecutive sequence of packet fragments;

the processing system configured to select an individual one of the backhaul links for each of the packet fragments based on correlating relative positions of the packet fragments in the consecutive sequence to the individual transmission delays of the backhaul links; and transfer simultaneously each of the packet fragments over the selected individual one of the backhaul links for delivery to the wireless access node so the packet fragments are received by the wireless access node in the consecutive sequence.

9. The wireless network control system of claim 8, the processing system configured to select increasingly latter packet fragments of the sequence of packet fragments for transfer over backhaul links with increasing transmission delays to select the individual one of the backhaul links for each of the packet fragments.

10. The wireless network control system of claim 8, the processing system configured to select increasingly latter packet fragments of the sequence of packet fragments for transfer over backhaul links with decreasing transmission delays to select the individual one of the backhaul links for each of the packet fragments.

11. The wireless network control system of claim 8, wherein the backhaul interface is configured to periodically exchange test data over each of the backhaul links and measure a transmit time of the test data over each of the backhaul links to monitor the individual transmission delays for the backhaul links.

12. The wireless network control system of claim 8, wherein the backhaul interface is configured to receive the data packet in the in the wireless network control system and the processing system is configured to obtain that the data packet is for transfer to the wireless access node.

13. The wireless network control system of claim 8, wherein the backhaul links each comprise Internet Protocol (IP) links.

14. The wireless network control system of claim 8, wherein the backhaul links each comprise T1 links.

15. A method of operating a communication system, wherein a wireless network control system communicates with a wireless access node over a plurality of backhaul links, the method comprising:

in the wireless network control system, monitoring individual transmission delays for the backhaul links;

in the wireless network control system, receiving a data packet for transfer to the wireless access node;

in the wireless network control system, identifying a consecutive sequence of packet fragments that comprise the data packet, separating the data packet into the consecutive sequence of packet fragments;

in the wireless network control system, selecting an individual one of the backhaul links for each of the packet fragments based on correlating relative positions of the packet fragments in the consecutive sequence to the individual transmission delays of the backhaul links;

in the wireless access node controller, simultaneously transferring individual ones of the packet fragments over the associated selected ones of the backhaul links for delivery to the wireless access node so the packet fragments are received by the wireless access node in the consecutive sequence;

in the wireless access node, receiving the packet fragments;

in the wireless access node, compositing the individual ones of the packet fragments in order of receipt by the wireless access node; and in the wireless access node, transferring the composited packet fragments to a user device over a wireless link.

16. The method of claim 15, wherein, in the wireless access node, if the composited packet fragments of the data are not received in the consecutive sequence, rejecting the composited packet fragments.

17. The method of claim 16, wherein rejecting the composited packet fragments comprises transferring a rejection indicator to the wireless access node controller.

18. The method of claim 15, wherein compositing the individual ones of the packet fragments in order of receipt by the wireless access node comprises compositing the individual ones of the packet fragments into a composited packet, wherein the composited packet comprises a header comprising an indicator of the user device and a payload comprising the packet fragments composited in the order of receipt by the wireless access node.

* * * * *